(12) United States Patent
Nakayama et al.

(10) Patent No.: US 9,422,882 B2
(45) Date of Patent: Aug. 23, 2016

(54) CONTROL APPARATUS AND METHOD FOR AN INTERNAL COMBUSTION ENGINE

(75) Inventors: Yusuke Nakayama, Gotemba (JP); Toru Kidokoro, Hadano (JP); Hiroshi Sawada, Gotemba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 590 days.

(21) Appl. No.: 13/821,377

(22) PCT Filed: Sep. 8, 2010

(86) PCT No.: PCT/JP2010/065407
§ 371 (c)(1),
(2), (4) Date: Mar. 7, 2013

(87) PCT Pub. No.: WO2012/032616
PCT Pub. Date: Mar. 15, 2012

(65) Prior Publication Data
US 2013/0173140 A1    Jul. 4, 2013

(51) Int. Cl.
*F02D 19/06* (2006.01)
*F02D 41/02* (2006.01)

(52) U.S. Cl.
CPC ........ *F02D 41/0255* (2013.01); *F02D 19/0615* (2013.01); *F02D 19/0647* (2013.01); *F02D 19/0668* (2013.01); *F02D 19/0692* (2013.01); *Y02T 10/36* (2013.01)

(58) Field of Classification Search
CPC ............ F02D 41/0235; F02D 41/0255; F02D 41/0025; F02D 41/0027; F02D 41/06; F02D 41/0602; F02D 41/064; F02D 41/068; F02D 41/027; F02D 41/0275; F02D 19/0613; F02D 19/0615; F02D 19/0646; F02D 19/0694; F02D 19/081
USPC ................ 123/672, 685, 525, 431, 575, 576; 701/103–105, 112, 113
See application file for complete search history.

(56) References Cited

FOREIGN PATENT DOCUMENTS

| JP | 2002-038980 A | 2/2002 |
|---|---|---|
| JP | 2005-069061 A | 3/2005 |
| JP | 2009-047071 A | 3/2009 |

*Primary Examiner* — Lindsay Low
*Assistant Examiner* — Robert Werner
(74) *Attorney, Agent, or Firm* — Kenyon & Kenyon LLP

(57) ABSTRACT

The present invention is intended to provide a technique of improving exhaust emissions at the time of starting up of an internal combustion engine, without decreasing the performance of a catalyst at the time of the engine starting up. The present invention is provided with the catalyst that is arranged in an exhaust passage of the internal combustion engine in which a plurality of kinds of fuels are able to be used, and serves to adsorb and remove exhaust gas components discharged from the internal combustion engine, wherein in cases where among the plurality of kinds of fuels, a first fuel is used in which unburnt fuel components thereof are easily adsorbed to the catalyst, at the time when a request is made for stopping the internal combustion engine, said first fuel is changed to a second fuel thereby to operate said internal combustion engine until said internal combustion engine is stopped.

4 Claims, 2 Drawing Sheets

CONTROL APPARATUS AND METHOD FOR AN INTERNAL COMBUSTION ENGINE

This is a 371 national phase application of PCT/JP2010/065407 filed 8 Sep. 2010, the contents of which are incorporated herein by reference.

TECHNICAL FIELD

The present invention relates to a control apparatus for an internal combustion engine and a control method for an internal combustion engine.

BACKGROUND ART

In an exhaust passage of an internal combustion engine, there is arranged a catalyst which serves to adsorb and remove exhaust gas components discharged from the internal combustion engine. At the time of starting up of the internal combustion engine, the catalyst is in an inactive state and the performance of adsorption and removal thereof decreases. For that reason, there has been disclosed a technique in which at the time of starting up of an internal combustion engine, gas fuel is used, and after a set period of time has elapsed from the engine starting up, the internal combustion engine is operated by changing the gas fuel to liquid fuel (for example, refer to a first patent document). According to this, in the first patent document, it is intended to provide good startability as well as to improve exhaust emissions at the time of the engine starting up. In addition, by suppressing the use of the gas fuel as much as possible, it is also intended to secure a sufficient cruising distance.

PRIOR ART DOCUMENTS

Patent Documents

Patent Document 1: Japanese patent application laid-open No. 2002-038980
Patent Document 2: Japanese patent application laid-open No. 2009-047071

DISCLOSURE OF THE INVENTION

Problem to be Solved by the Invention

However, it has become clear that the performance of the catalyst to adsorb and remove the exhaust gas components at the time of the starting up of the engine is affected by the influence of the catalyst before the engine is started up. In cases where before the starting up of the engine, a fuel is used in which unburnt fuel components thereof is easily adsorbed to the catalyst of which the temperature has become low after the stop of the engine, thereby decreasing the performance of the catalyst to adsorb and remove exhaust gas components at the time of the next starting up of the engine, the unburnt fuel components which are easily adsorbed to the catalyst will be contained in the exhaust gas which arrives at the catalyst at the time when the engine is stopped. These unburnt fuel components will be adsorbed to the catalyst when the temperature of the catalyst falls after the stop of the engine. For that reason, at the time of the next engine starting up, these unburnt fuel components have already been adsorbed to the catalyst, and hence, the performance of the catalyst to adsorb and remove the exhaust gas components at the time of the engine starting up decreases, so that it becomes impossible for the catalyst to adsorb and remove the exhaust gas components discharged from the internal combustion engine when the engine is started up. As a result of this, the exhaust gas components at the time of the engine starting up will pass through the catalyst without being adsorbed, and will be discharged to the outside, thus giving rise to a problem that exhaust emissions at the time of the engine starting up gets worse.

The present invention has been made in view of the above-mentioned circumstances, and has for its object to provide a technique of improving exhaust emissions at the time of starting up of an engine, without decreasing the performance of a catalyst at the time of the engine starting up.

MEANS FOR SOLVING THE PROBLEM

Means for Solving the Problems

In the present invention, the following construction is adopted. That is, the present invention resides in a control apparatus for an internal combustion engine, which is provided with:

a catalyst that is arranged in an exhaust passage of the internal combustion engine in which a plurality of kinds of fuels are able to be used, and serves to adsorb and remove exhaust gas components discharged from said internal combustion engine; and a control part that changes a fuel to be used from a first fuel to a second fuel thereby to operate said internal combustion engine until said engine is stopped, in cases where among said plurality of kinds of fuels, said first fuel is used in which unburnt fuel components thereof are easily adsorbed to said catalyst at the time when a request is made for stopping said internal combustion engine.

According to this invention, by changing over the fuel to be used to the second fuel, the internal combustion engine is operated until the engine is stopped, so it is possible to suppress the unburnt fuel components from being adsorbed to the catalyst of which the temperature has become low after the stop of the engine. As a result of this, the unburnt fuel components have not been adsorbed to the catalyst at the time of the next starting up of the engine, and the performance of the catalyst at the time of the engine starting up is not decreased, so that the exhaust gas components discharged from the internal combustion engine can be adsorbed to and removed by the catalyst from the beginning of the engine starting up. Accordingly, when the engine is started up, the exhaust gas components do not pass through the catalyst without being adsorbed, thus making it possible to improve exhaust emissions at the time of the engine starting up.

It is preferable that said control part control to operate said internal combustion engine by the use of said second fuel at least until the exhaust gas which has been discharged from said internal combustion engine operated by the use of said second fuel arrives at said catalyst, before the engine is stopped.

According to this invention, the second fuel arrives at the catalyst at the time when the engine is stopped, so that it is possible to suppress unburnt fuel components from being adsorbed to the catalyst of which the temperature has become low after the stop of the engine. In addition, it is also possible to make the period of time until the engine is stopped into a necessary minimum.

It is also preferable that said first fuel be liquid fuel, and said second fuel be natural gas.

The liquid fuel contains a large amount of non-methane hydrocarbons, and the non-methane hydrocarbons tend to adsorb to the catalyst of which the temperature has become low after the stop of the engine, thereby decreasing the performance of the catalyst at the time of the next starting up of the engine. The natural gas has methane as its main component, and includes a small proportion of non-methane hydrocarbons. According to the present invention, the internal combustion engine is operated until the engine is stopped, by changing over the fuel to be used from a liquid fuel to natural gas, so it is possible to suppress non-methane hydrocarbons from being adsorbed to the catalyst after the stop of the engine.

The present invention also resides in a control method for an internal combustion engine equipped with a catalyst that is arranged in an exhaust passage of the internal combustion engine in which a plurality of kinds of fuels are able to be used, and said catalyst serves to adsorb and remove exhaust gas components discharged from said internal combustion engine, wherein a fuel to be used is changed from a first fuel to a second fuel thereby to operate said internal combustion engine until said engine is stopped, in cases where among said plurality of kinds of fuels, said first fuel is used in which unburnt fuel components thereof are easily adsorbed to said catalyst at the time when a request is made for stopping said internal combustion engine.

According to this invention, too, it is possible to improve exhaust emissions at the time of starting up of the engine, without decreasing the performance of the catalyst at the time of the engine starting up.

Effects of the Invention

According to the present invention, it is possible to improve exhaust emissions at the time when an engine is started up, without decreasing the performance of a catalyst at the time of starting up of the engine.

THE BEST MODE FOR CARRYING OUT THE INVENTION

Hereinafter, a specific embodiment of the present invention will be described.

<First Embodiment>

Figure 1:
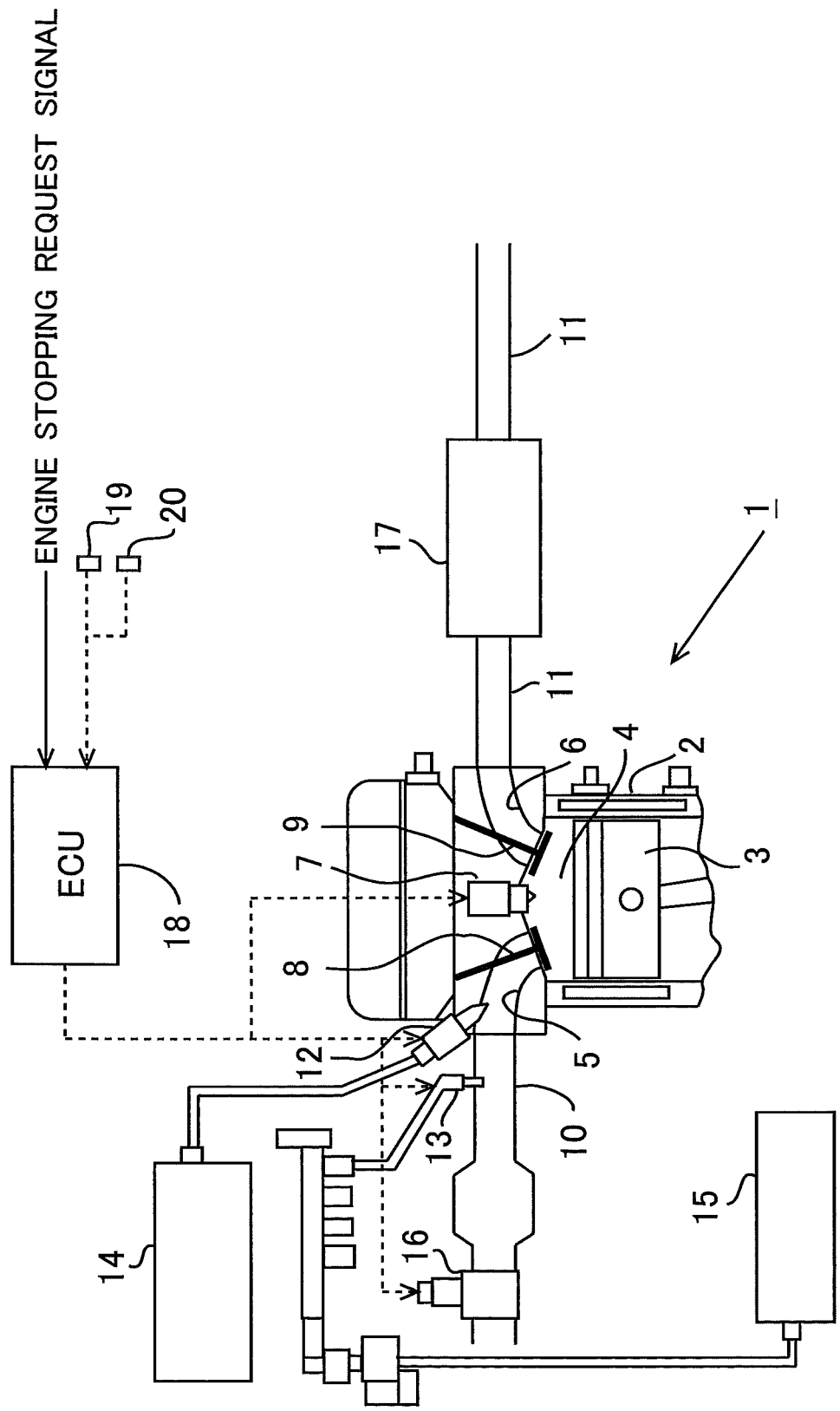
FIG. 1 is a view showing the schematic construction of an internal combustion engine according to a first embodiment of the present invention.

FIG. 1 is a view showing the schematic construction of an internal combustion engine according to a first embodiment of the present invention. As fuel for the internal combustion engine 1 shown in FIG. 1, there can be used liquid fuel such as a petroleum-based liquid fuel like gasoline, a mixed liquid fuel in which oxygenated fuel such as alcohol like ethanol, methanol, etc., or MTBE, is mixed with a petroleum-based liquid fuel such as gasoline. In addition, as fuel for the internal combustion engine 1, there can also be used gas fuel such as compressed natural gas (CNG). Thus, the internal combustion engine 1 of the present invention can use a plurality of kinds of fuels. In this embodiment, as an example, there is mentioned a case where gasoline is used as a liquid fuel, and CNG is used as a gas fuel. The gasoline corresponds to a first fuel of the present invention, and the CNG corresponds to a second fuel of the present invention.

A piston 3 is arranged inside a cylinder 2 of the internal combustion engine 1 for sliding movement relative thereto. In an upper portion inside the cylinder 2, there is defined a combustion chamber 4 by means of an upper wall and an inner wall of the cylinder 2 and a top surface of the piston 3. An intake port 5 and an exhaust port 6 are connected to the upper portion of the combustion chamber 4. A spark plug 7 for igniting an air fuel mixture inside the cylinder 2 is arranged in the upper portion of the cylinder 2. An opening portion of the intake port 5 to the combustion chamber 4 is opened and closed by an intake valve 8. Also, an opening portion of the exhaust port 6 to the combustion chamber 4 is opened and closed by an exhaust valve 9. The intake port 5 is connected at its upstream side to an intake pipe 10. The exhaust port 6 is connected at its downstream side to an exhaust pipe 11. The intake port 5 and the intake pipe 10 in this embodiment correspond to an intake passage. The exhaust port 6 and the exhaust pipe 11 in this embodiment correspond to an exhaust passage of the present invention.

In the intake port 5, a first fuel injection valve 12 is arranged which serves to inject gasoline to intake air flowing through the intake port 5. In the intake pipe 10, a second fuel injection valve 13 is arranged which serves to inject CNG to intake air flowing through the intake pipe 10. The fuels injected from the first fuel injection valve 12 and the second fuel injection valve 13 are mixed with the intake air to form an air fuel mixture. The gasoline stored in a first fuel tank 14 is supplied to the first fuel injection valve 12. In a fuel system extending from the first fuel tank 14 to the first fuel injection valve 12, there can be used other mixed liquid fuels. The CNG stored in a second fuel tank 15 is supplied to the second fuel injection valve 13. A throttle valve 16 is arranged in the intake pipe 10 at a location upstream of the second fuel injection valve 13. The amount of intake air flowing through the intake pipe 10 can be adjusted by the throttle valve 16.

In the exhaust pipe 11, a three-way catalyst 17 is arranged which serves to store and remove exhaust gas components discharged from the internal combustion engine 1. The three-way catalyst 17 has a function to store and remove hydrocarbons, carbon monoxide and NOx. The three-way catalyst 17 corresponds to a catalyst of the present invention. Here, note that the catalyst of the present invention may be any catalyst other than the three-way catalyst.

In the internal combustion engine 1, there is arranged in combination therewith an ECU (Electronic Control Unit) 18 for controlling the internal combustion engine 1. The ECU 18 is a unit that controls the operating state of the internal combustion engine 1 in accordance with the operating conditions of the internal combustion engine 1 and/or driver's requirements. A variety of kinds of sensors such as an accelerator position sensor 19, a crank position sensor 20, and so on are connected to the ECU 18 through electrical wiring, so that output signals of these various sensors are inputted to the ECU 18. On the other hand, the spark plug 7, the first fuel injection valve 12, the second fuel injection valve 13, the throttle valve 16 and so on are connected to the ECU 18 through electrical wiring, so that these valves are controlled by means of the ECU 18.

(Control at the Time of Engine Stop)

When the three-way catalyst 17 is at a low temperature at which it is in an inactive state, the amount of NOx emission to be discharged to the outside can be reduced by causing NOx to adsorb to the three-way catalyst 17. However, when gasoline is used as fuel for the internal combustion engine 1, the proportion of non-methane hydrocarbons, which are contained in the exhaust gas discharged from the internal combustion engine 1, is high, so that the non-methane hydrocarbons will adsorb to the three-way catalyst 17 more preferentially than NOx. In other words, when gasoline is used at the time of the three-way catalyst 17 being low in temperature, NOx will not be able to be absorbed to the three-way catalyst 17, but NOx will become easy to be discharged to the outside.

On the other hand, the main component of CNG is methane, and about 90% of the hydrocarbons, which are unburnt fuel components contained in the exhaust gas discharged from the internal combustion engine 1, are methane, and so, the proportion of non-methane hydrocarbons contained in the exhaust gas is low. Moreover, it is difficult for methane to adsorb to the three-way catalyst 17 of low temperature. As a result, even at the time when the temperature of the three-way catalyst 17 is low, it is possible to suppress the non-methane hydrocarbons from adsorbing to the three-way catalyst 17 more preferentially than NOx. Accordingly, in cases where CNG is used at the time when the temperature of the three-way catalyst 17 is low, NOx can be caused to adsorb to the three-way catalyst 17, so that the NOx emission discharged to the outside can be reduced.

For that reason, in the internal combustion engine 1 in which gasoline and CNG can be used, CNG with a small amount of discharge of NOx emission is used from the starting up of the internal combustion engine 1 until the completion of the warming up of the three-way catalyst 17, and after that, the fuel to be used is changed over from CNG to gasoline. According to this, even when the temperature of the three-way catalyst 17 is low, a sufficient cruising distance is ensured by suppressing the use of CNG as much as possible, while suppressing the amount of NOx emission during the operation of the internal combustion engine 1.

However, it has been found that the above-mentioned problem can not be eliminated according to the state of the three-way catalyst 17 from before the starting up of the engine. After the operation of the internal combustion engine 1 is stopped, the non-methane hydrocarbons in the exhaust gas staying in the exhaust pipe 11 in the vicinity of the three-way catalyst 17 are adsorbed to the three-way catalyst 17. This adsorption will occur at the time when the temperature of the three-way catalyst 17 becomes equal to or lower than a removal temperature, for example, at which the non-methane hydrocarbons are removed with the three-way catalyst 17. Although the temperature of the three-way catalyst 17 is higher than the above-mentioned removal temperature immediately after the operation of the internal combustion engine 1 is stopped, the three-way catalyst 17 is getting cold after that, and when the temperature of the three-way catalyst 17 becomes equal to or lower than the above-mentioned removal temperature, adsorption of the non-methane hydrocarbons to the three-way catalyst 17 will occur.

The content of the non-methane hydrocarbons in the exhaust gas is considerably larger in the case of gasoline than in the case of CNG, and hence, if the operation of the internal combustion engine 1 is stopped during the use of gasoline, the amount of non-methane hydrocarbons adsorbed to the three-way catalyst 17 after the stop of the internal combustion engine 1 will increase. When the internal combustion engine 1 is started up in such a state, the NOx in the exhaust gas immediately after the next starting up of the engine can not be made to adsorb to the three-way catalyst 17, because the non-methane hydrocarbons have already been adsorbed to the three-way catalyst 17. In other words, at the time of the next starting up of the engine, the performance of the adsorption and removal of the three-way catalyst 17 with respect to NOx will decrease. Accordingly, even if CNG is used immediately after the next starting up of the engine, the NOx which is not adsorbed will pass through the three-way catalyst 17, so that the amount of NOx emission released to the outside will increase, thus causing the deterioration of exhaust emissions.

Accordingly, in this embodiment, in cases where gasoline is used, at the time of a request for stopping the internal combustion engine 1, the fuel to be used is changed over from gasoline to CNG, so that the internal combustion engine 1 is caused to operate with the CNG until the engine is stopped. This control is referred to as engine stopping control, and the ECU 18, which executes this control, corresponds to a control part of the present invention.

Here, note that the first fuel corresponding to gasoline is a fuel which is liable to cause the non-methane hydrocarbons as unburnt fuel components to adsorb to the three-way catalyst 17 of which the temperature has become low after the stop of the engine, thereby decreasing the performance of the adsorption and removal of the three-way catalyst 17 with respect to NOx at the time of the next starting up of the engine. In other words, the first fuel is a fuel which is liable to cause the unburnt fuel components to adsorb to the three-way catalyst 17. As the first fuel, there are mentioned gasoline and other liquid fuels with a large content of non-methane hydrocarbons. The second fuel corresponding to CNG is a fuel which is less prone to cause the non-methane hydrocarbons as unburnt fuel components to adsorb to the three-way catalyst 17 of which the temperature has become low after the stop of the engine, thereby preventing a decrease in the performance of the adsorption and removal of the three-way catalyst 17 with respect to NOx at the time of the next starting up of the engine. In other words, the second fuel is a fuel other than the first fuel. As the second fuel, there is mentioned CNG which includes a small content of non-methane hydrocarbons and has methane as its main component.

According to this embodiment, the internal combustion engine 1 is operated until the engine is stopped, by changing over the fuel to CNG, so it is possible to suppress non-methane hydrocarbons from being adsorbed to the three-way catalyst 17 after the stop of the engine. As a result of this, the non-methane hydrocarbons have not been adsorbed to the three-way catalyst 17 at the time of the next starting up of the engine, and the performance of the adsorption and removal of the three-way catalyst 17 with respect to NOx at the time of the starting up of the engine does not decrease, thus making it possible to adsorb and remove the NOx discharged from the internal combustion engine 1 by means of the three-way catalyst 17, from the beginning of the starting up of the engine. Accordingly, when the engine is started up, NOx does not pass through the three-way catalyst 17 without being adsorbed, and so, it is possible to improve exhaust emissions at the time of the starting up of the engine.

Here, in the engine stopping control, the internal combustion engine 1 is caused to operate by the use of CNG until the exhaust gas which has been discharged from the internal combustion engine 1 operated by the use of CNG arrives at the three-way catalyst 17 before the engine is stopped.

According to this embodiment, because the exhaust gas discharged from the internal combustion engine 1 by the use of CNG therein at the time of the stop of the engine arrives at the three-way catalyst 17, it is possible to suppress the non-methane hydrocarbons from adsorbing to the three-way catalyst 17 after the stop of the engine. In addition, it is also possible to make the period of time until the engine is stopped into a necessary minimum, thereby making it possible to prevent a user's feeling of delay.

Here, note that in the engine stopping control, in order to cause the exhaust gas discharged from the internal combustion engine 1 to arrive at a downstream side of the three-way catalyst 17 in a reliable manner while using CNG at the time of the stop of the engine, the internal combustion engine 1 may be caused to operate in a continuous manner after the exhaust gas discharged from the internal combustion engine 1 by the use of CNG has arrived at the three-way catalyst 17, too, before the engine is stopped.

(Engine Stopping Control Routine)

Figure 2:
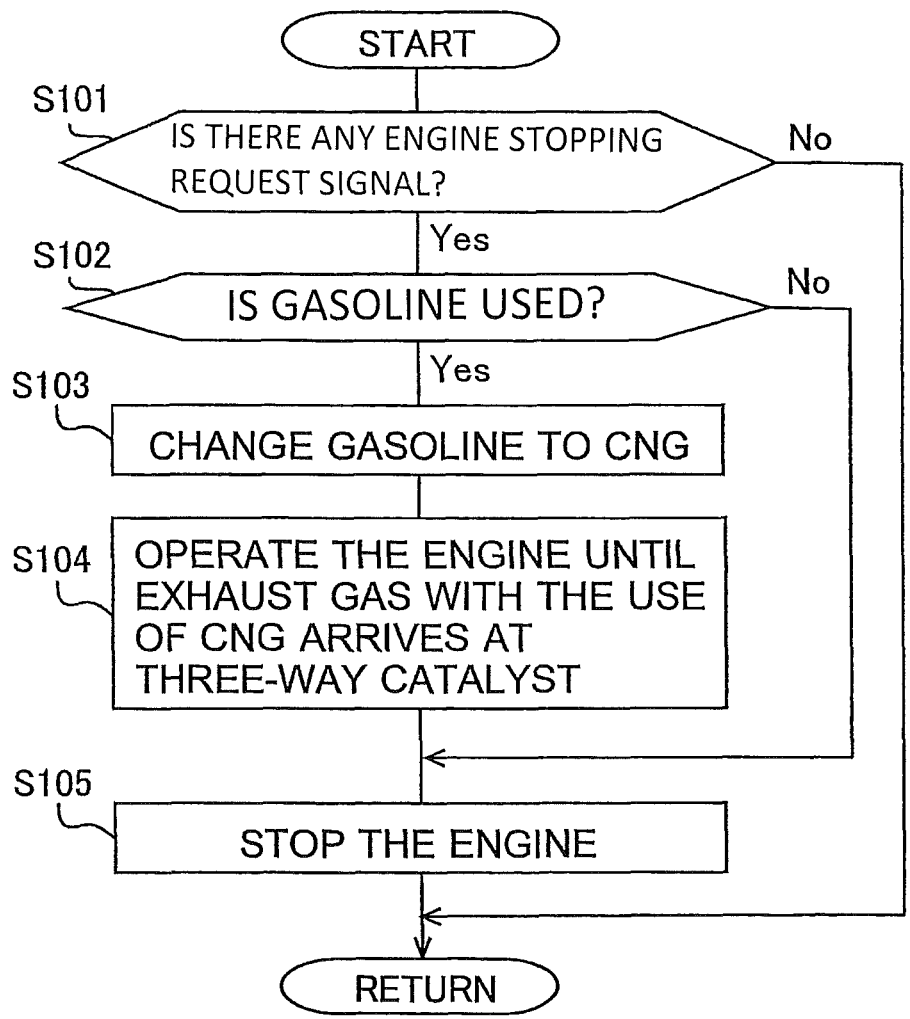
FIG. 2 is a flow chart showing an engine stopping control routine according to the first embodiment.

FIG. 2 is a flow chart showing an engine stopping control routine which is executed at the time when the internal combustion engine 1 is stopped. The engine stopping control routine will be explained based on the flow chart shown in FIG. 2. This routine is repeatedly carried out by means of the ECU 18 at each predetermined time interval. The ECU 18 executing this routine corresponds to a control part of the present invention.

When this routine is carried out, first in step S101, it is determined whether there is a request for stopping the operation of the internal combustion engine 1 generated by a user. A determination that there is an engine stopping request can be made based on the fact that the ECU 18 receives an engine stopping request signal generated by the user. The engine stopping request signal is generated in cases where the user turns off an ignition switch, for example. In cases where an affirmative determination is made in step S101, the routine advances to step S102. On the other hand, in cases where a negative determination is made in step S101, this routine is once ended.

In step S102, it is determined whether the fuel used at present is gasoline. This can be determined by the ECU 18 based on which fuel, gasoline or CNG, is used to operate the internal combustion engine 1. In cases where an affirmative determination is made in step S102, the routine advances to step S103, whereas in cases where a negative determination is made in step S102, the routine advances to step S105.

In step S103, the fuel is changed from gasoline to CNG.

In step S104, in a state of CNG being used, the internal combustion engine 1 is operated until the exhaust gas discharged from the internal combustion engine 1 using CNG arrives at the three-way catalyst 17 before the engine is stopped. The operation period of time in this step 104 may also be a predetermined period of time which has been obtained in advance by experiments, etc., or may also be obtained by calculating, from the engine speed or the amount of intake air, a period of time until the exhaust gas discharged from the internal combustion engine 1 at least using CNG arrives at the three-way catalyst 17.

In step S105, the operation of the internal combustion engine 1 is caused to stop. After the processing of this step, this routine is once ended.

According to this routine explained above, it is possible to suppress the non-methane hydrocarbons from being adsorbed to the three-way catalyst 17 of which the temperature has become low after the stop of the internal combustion engine 1 in which CNG and gasoline are able to be used, whereby it is possible to improve exhaust emissions at the time of the next starting up of the engine, without decreasing the performance of the adsorption and removal of the three-way catalyst 17 with respect to NOx at the time of the next starting up of the engine.

The control apparatus for an internal combustion engine according to the present invention is not limited to the above-mentioned embodiment, but can be subjected to various changes and modifications within the scope not departing from the gist of the present invention. In addition, the above-mentioned embodiment is also an embodiment of a control method for an internal combustion engine according to the present invention.

DESCRIPTION OF THE REFERENCE NUMERALS AND SYMBOLS

1: internal combustion engine
2: cylinder
3: piston
4: combustion chamber
5: intake port
6: exhaust port
7: spark plug
8: intake valve
9: exhaust valve
10: intake pipe
11: exhaust pipe
12: first fuel injection valve
13: second fuel injection valve
14: first fuel tank
15: second fuel tank
16: throttle valve
17: three-way catalyst
18: ECU
19: accelerator position sensor
20: crank position sensor

The invention claimed is:

1. A control apparatus for an internal combustion engine comprising:
    a catalyst that is arranged in an exhaust passage of the internal combustion engine in which a plurality of kinds of fuels are able to be used, and serves to adsorb and remove hydrocarbons and NOx which are exhaust gas components discharged from said internal combustion engine; and
    a control part that changes a fuel to be used from a first fuel to a second fuel, which contains a small content of non-methane hydrocarbons and has methane as its main component, thereby to operate said internal combustion engine until said internal combustion engine is stopped, in cases where among said plurality of kinds of fuels, said first fuel is used which has a large content of non-methane hydrocarbons, which adsorb to said catalyst of which the temperature has become low more preferentially than NOx, at the time when a request is made for stopping said internal combustion engine,
    wherein said control part controls operation of said internal combustion engine by the use of said second fuel at least until the exhaust gas which has been discharged from said internal combustion engine operated by the use of said second fuel arrives at said catalyst, and before said internal combustion engine is stopped.

2. The control apparatus for an internal combustion engine as set forth in claim 1, wherein
    said control part uses said second fuel from a time when said internal combustion engine is started up until a time when the warming up of said catalyst is completed.

3. A control method for an internal combustion engine equipped with a catalyst that is arranged in an exhaust passage of the internal combustion engine in which a plurality of kinds of fuels are able to be used, and said catalyst serves to adsorb and remove hydrocarbons and NOx which are exhaust gas components discharged from said internal combustion engine,
    wherein, in cases where among said plurality of kinds of fuels, a first fuel is used which has a large content of non-methane hydrocarbons, which adsorb to said catalyst of which the temperature has become low more preferentially than NOx, at the time when a request is made for stopping said internal combustion engine, said first fuel is changed to a second fuel which contains a small content of non-methane hydrocarbons and has methane as its main component, thereby to operate said internal combustion engine until said internal combustion engine is stopped, wherein said internal combustion engine is operated by the use of said second fuel at least until the exhaust gas which has been discharged from said internal combustion engine operated by the use of said second fuel arrives at said catalyst and before said internal combustion engine is stopped.

4. The control method for an internal combustion engine as set forth in claim 3, wherein said second fuel is used from a time when said internal combustion engine is started up until a time when the warming up of said catalyst is completed.

* * * * *